J. R. SNYDER.
TRIPLE VALVE.
APPLICATION FILED OCT. 28, 1912.

1,164,025.

Patented Dec. 14, 1915.
3 SHEETS—SHEET 1.

WITNESSES
Alfred S. Osbourne
C. B. Sanderson

INVENTOR
Jacob Rush Snyder
By Fredk W. Winter
Attorney

J. R. SNYDER.
TRIPLE VALVE.
APPLICATION FILED OCT. 28, 1912.

1,164,025.

Patented Dec. 14, 1915.
3 SHEETS—SHEET 2.

FIG. 2

WITNESSES
Alfred S. Osbourne
C. B. Sanderson

INVENTOR
Jacob Rush Snyder
By Fred'k W. Winter
Attorney

J. R. SNYDER.
TRIPLE VALVE.
APPLICATION FILED OCT. 28, 1912.

1,164,025.

Patented Dec. 14, 1915.
3 SHEETS—SHEET 3.

WITNESSES
Alfred S. Osborne
C. B. Sanderson

INVENTOR
Jacob Rush Snyder
By Fredk W. Winter
Attorney

COLUMBIA PLANOGRAPH CO., WASHINGTON, D. C.

UNITED STATES PATENT OFFICE.

JACOB RUSH SNYDER, OF PITTSBURGH, PENNSYLVANIA, ASSIGNOR TO PERCY E. DONNER, OF PITTSBURGH, PENNSYLVANIA.

TRIPLE VALVE.

1,164,025.

Specification of Letters Patent. Patented Dec. 14, 1915.

Application filed October 28, 1912. Serial No. 728,278.

*To all whom it may concern:*

Be it known that I, JACOB RUSH SNYDER, a resident of Pittsburgh, in the county of Allegheny and State of Pennsylvania, have invented a new and useful Improvement in Triple Valves, of which the following is a specification.

This invention relates to triple valves for air brake systems, and more particularly for freight car service.

The principal object of the invention is to provide triple valve mechanism whereby after full service application of the brakes, such as produced by equalization between the auxiliary reservoir, train pipe and the usual brake cylinder, additional braking power can be secured so as to hold the car when loaded on steep grades without the use of hand brakes. To this end, the triple valve mechanism is so arranged that after full service application, by further reduction of train pipe pressure fluid pressure can be graduated into a supplementary or emergency brake cylinder at the will of the engineer and to any desired degree practically to complete depletion of train pipe pressure, but without destroying the other functions of triple valve mechanism or disturbing the braking effect of the other triple valves in the train. As a consequence, the braking power can be so proportioned that the ordinary full service application provides sufficient power to hold the car when empty, and by means of the additional or high pressure application, the braking power can be increased so as to hold the car when loaded on steep grades.

Further objects of the invention are to provide a triple valve having all of the usual functions of triple valves and in addition so arranged as to produce a quick release of the brakes throughout the train, a quick serial action of the brakes throughout the train in service application as well as in emergency application, and, further, so arranged as to supply the service brake cylinder with pressure in proportion to train pipe reduction and irrespective of variations in piston travel, and to maintain said brake cylinder pressure against leakage in service applications; and which performs these various functions by a much simpler and less complicated construction than prior valves capable of effecting only a part of these results and functions.

The invention comprises the construction and arrangement of a triple valve hereinafter described and claimed.

In the accompanying drawings.

The valve in its general form, construction and arrangement follows the standard type of Westinghouse and similar valves. It comprises a main body or casing portion 1 provided at one end with a flat face 2 for the usual connection to the auxiliary reservoir and brake cylinder, when desired, and is closed at its opposite end by the head or cap 3. In said casing is the usual chamber 4 in which works the main piston 5 which is provided with a stem 6 extending into the chamber or bore 7 and actuating the slide valves. The auxiliary reservoir 8 is connected by pipe 9 with the end of chamber or bore 7, and is normally charged through the feed groove 10 in the bushing forming the wall of chamber 4, which feed groove is open when the main piston is in full release position.

The train pipe is connected to the passage 11 which extends through the casing and communicates with the chamber 12 in the head or cap 3, from which chamber communication is had with piston chamber 4 through port 13.

Figure 5:
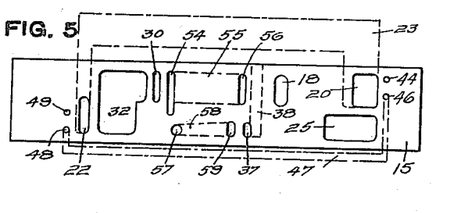
Fig. 5 is a plan view of the main slide valve seat on an enlarged scale.

The lower part of the bushing 14 in the chamber or bore 7 provides a seat 15 for the main slide valves 16 and 17 which are actuated from the main piston 5. This valve seat is provided with the ports and passages shown in Fig. 5, to-wit; an exhaust port 18 which communicates with a transverse passage 19 leading out to the atmosphere; a large port 20 near one end of the valve seat which communicates with the passage 21 having a valve-controlled connection with the chamber 12, and, therefore, being a train pipe port; another port 22 located near the opposite end of the valve seat and having communication through the passage 23 formed in the valve casing with the train pipe port 20, therefore, constituting an auxiliary train pipe port; a port 25 located transversely in line with train pipe port 20 and communicating with a chamber 26 in the casing from which a passage 27 leads by way of pipe 27ª to the emergency brake cylinder 29, said passage being controlled by a spring actuated check valve 28 seating away from the emergency brake cylinder; a smaller port 30 communicating with passage 31 which unites with the passage 27 and extends out through the side of the casing where it is connected to the emergency brake cylinder; a large port 32 extending substantially entirely across the valve seat and communicating with passage 33 in the casing and extending out through the end thereof and having a connection 34 to the supplementary reservoir 35; a small port 37 which communicates with a transverse passage 38 leading to the longitudinal passage 39 in the outer face of the bushing and extending longitudinally through the casing and having a connection 40 with the application chamber 41; a small port 44 adjacent the outer end of the valve seat and having a connection through passage 45 with the train pipe passage 11; a small port 46 transversely in line with port 44 and connected through groove 47 in the outer face of bushing 14 with a small port 48 at the opposite end of the valve seat; a small port 49 transversely in line with port 48 and having connection through passage 50 with a longitudinal passage 51 from which a pipe 52 leads to the service brake cylinder 53; a port 54 adjacent to and longitudinally in line with emergency brake cylinder port 30 and connected by an underneath passage 55 with a port 56 longitudinally in line with and adjacent to exhaust port 18; and a port 57 transversely in line with port 54 and connected by underneath passage 58 with a port 59 longitudinally in line with and adjacent the application chamber port 37.

The valve 17 is held between an end annular collar 61 and an intermediate annular collar 62 on the main piston stem 6 and fills the space between said collars so that it moves at all times with the main piston. The valve 16 is held between the intermediate annular collar 62 and an annular shoulder 63, but does not fill the space between said collar and shoulder so that the main piston and valve 17 have movement independent of the valve 16. These valves are held to the seat by the usual springs 64.

The valve 17 is of substantially rectangular form, having one corner cut away, as at 66, and is provided in its lower face with a number of recesses, to-wit; a relatively small recess 67 near its outer end; a large recess 68 near its middle, which recess 68 extends nearly across the valve and is provided with a longitudinal extension 69; a small transverse recess 70 near its outer end, and a cavity 71 extending inwardly from one edge thereof. It is also provided with a small hole 72 extending through said valve and may, if desired, be provided with another hole 73 near its inner end, the latter being shown in dotted lines.

The valve 16 is of rectangular form and is provided with the following cavities or recesses in its bottom face, to-wit; a small transverse cavity 75 near its outer end; a large L-shaped cavity 76 located near its central portion and having its longer leg extending transversely of the valve and its shorter leg extending longitudinally thereof; a large longitudinal cavity 78 on one side of the longitudinal center and provided with a transverse extension 79; and a smaller cavity 80 near the inner end of said valve.

On one side of the main casing is provided the casing 82 for a supplementary valve mechanism. In this casing is a chamber 83 in which works a piston 84 provided with a stem 85 projecting inwardly and carrying an arm or projection 86 which actuates a slide valve 87 on the valve seat 88. The piston and valve are normally held inwardly by means of spring 90 interposed between the piston and the head or cap 91 which closes the outer end of piston chamber 83. Said chamber 83 outside of the piston 84 has communication through passage 93 with a groove 94 formed in the upper outer face of bushing 14 and extending around the same and communicating with passage 39 leading to the application chamber 41, and which passage is constantly open so that the pressure in chamber 83 on the outer face of the supplementary piston 84 is always the same as in the application chamber 41. The chamber 95 on the inner face of the supplementary piston 84 has communication through passage 96 with the service brake cylinder passage 51 so that the pressure on the inner face of piston 84 is always equal to the pressure in the service brake cylinder. The slide valve 87 is held to the seat 88 by means of spring 97, and said valve works in a chamber 99 which is in direct connection with the supplementary reservoir passage 33, and this connection is always open so that supplementary reservoir pressure acts constantly on top of slide valve 87. The valve seat 88 is provided with a small port 100 which communicates with the transverse passage 101 leading to the atmosphere and, therefore, forming an exhaust, and with a large opening or port 102 communicating with the service brake cylinder passage 96 and through which the arm or projection 86 which actuates slide valve 87 extends. The slide valve 87 is provided on its lower face with a transversely arranged cavity 103.

The movement of the main piston 5 under train pipe reduction is controlled by a graduating stem 105 which is normally held inwardly by the graduating spring 106 interposed between the outer end of said stem and the outer portion of the head or cap 3. The graduating stem 105 is slidable through a member 107, in which is an annular passage 108 forming a communication between the chamber 12 and train pipe passage 21 in the valve casing. The annular passage 108 is surrounded by seat 109 with which coöperates valve 110 which is normally held to said seat by means of spring 111. The valve 110 is slidable on graduating stem 105 and is operatively connected thereto by pin 112 extending through the valve and through a longitudinal slot 113 in the graduating stem. Another pin 114 also extends through said slot in the stem and is secured to the inner end of the nut in cap or head 3 and limits the inward movement of the graduating stem. The slot and pin connection 112 and 113 permits the valve 110 to slide on the graduating stem, and the graduating stem also is enabled to move outwardly a limited distance without disturbing valve 110, but when moved outwardly under emergency movement of the main piston the inner end of the slot 113 contacts with the pin 112 and unseats valve 110, thereby opening communication from the train pipe chamber 12 to the passage 21 leading to port 20 in the valve seat.

The main valve has seven positions, as follows:—

Figure 1:
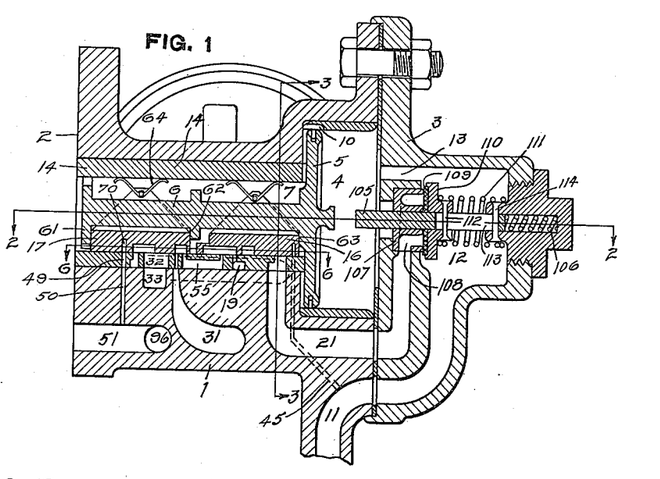
Figure 1 is a longitudinal vertical section through a triple valve embodying the invention when in full release and running position, taken on the line 1—1, Fig. 6.
Figure 2:
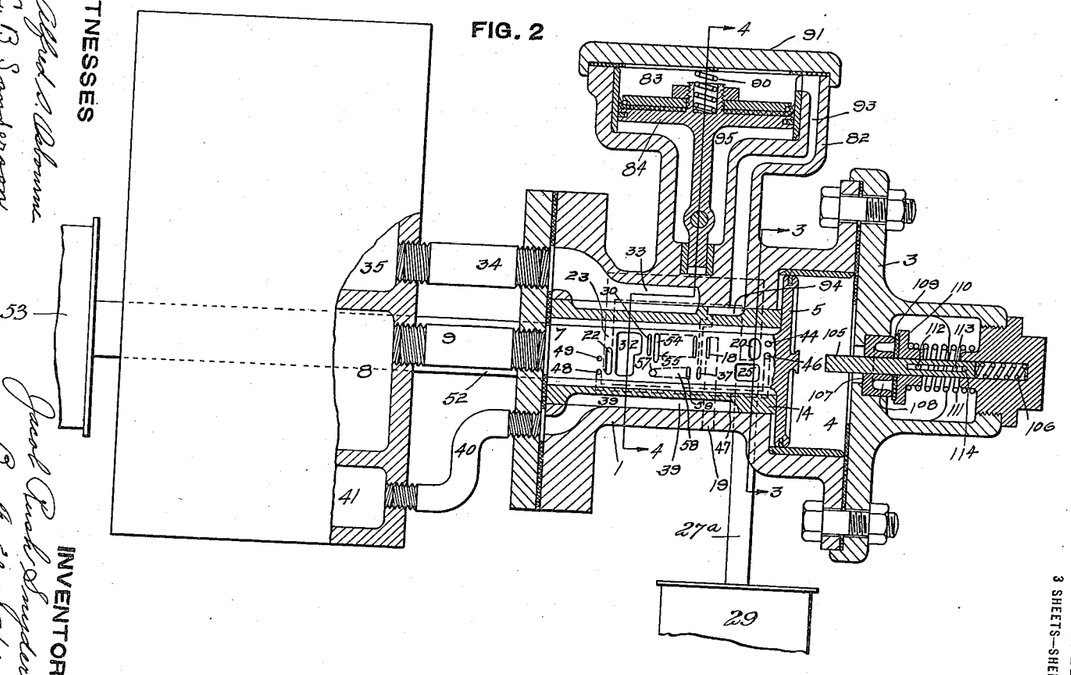
Fig. 2 is a longitudinal horizontal section through the valve taken on the line 2—2, Fig. 1, and showing the connections to the auxiliary reservoir, supplementary reservoir and application chamber.
Figure 3:
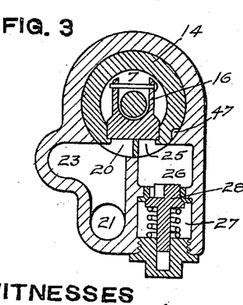
Fig. 3 is a vertical transverse section on the line 3—3, Figs 1 and 2.
Figure 4:
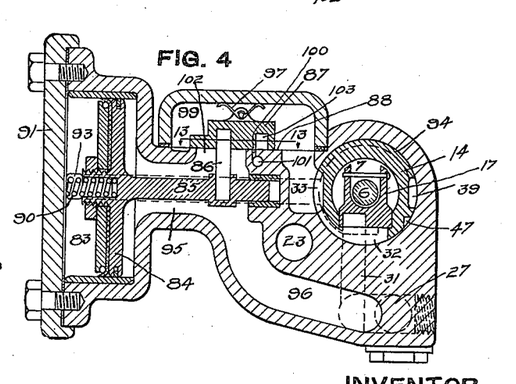
Fig. 4 is a similar view on the line 4—4, Fig. 2.
Figure 6:
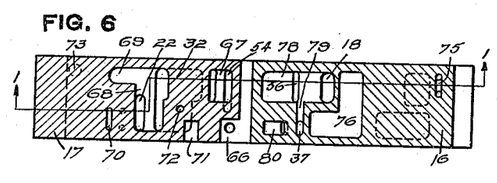
Figs. 6, 7, 8, 9, 10, 11 and 12 are diagrammatic views showing the main valve seat in plan and the main slide valves in horizontal section on the line 6—6, Fig. 1, and showing different positions of the valve, Fig. 6 showing the same in full and quick release and running position, Fig. 7 in quick service or quick serial application position, Fig. 8 in full service position, Fig. 9 in service lap position, Fig. 10 in high pressure application position, Fig. 11 in high pressure lap position, and Fig. 12 in emergency application position.
Figure 13:
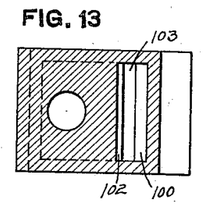
Figs. 13, 14 and 15 are diagrammatic views of the supplementary valve seat in plan and the supplementary slide valve in horizontal section on the line 13—13, Fig. 4, and showing the different positions of this valve, Fig. 13 showing the same in release position, Fig. 14 in service and release lap position, and Fig. 15 in service and pressure maintenance position.
Figure 14:
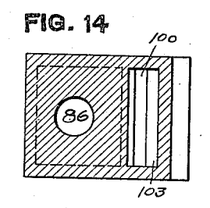

1. Full and quick release and running position, shown in Figs. 1, 3 and 6. In this position the main piston is at its extreme forward or inward stroke and uncovers feed groove 10 to permit train pipe pressure to flow to the auxiliary reservoir and charge the same. The hole 72 through valve 17 as well as the cavity 71 extending inwardly from the side of slide valve 17 registers with supplementary reservoir port 32 so that the supplementary reservoir is charged along with the auxiliary reservoir. Emergency brake cylinder port 30 is connected by cavity 67 in valve 17 with release port 54, and the companion release port 56 is connected by cavity 78 in slide valve 16 with the exhaust port 18 so that the emergency brake cylinder is exhausted to the atmosphere. Extension 79 of cavity 78 also overlaps application chamber port 37 so that pressure from the application chamber is exhausted. This results in exhaustion of the pressure from chamber 83 on the outer face of supplementary piston 84 and consequently said piston is forced outwardly by service brake cylinder pressure acting against its inner face and draws slide valve 87 to the position shown in Fig. 13, wherein the cavity 103 connects the brake cylinder port 102 with exhaust port 100. Consequently, the service brake cylinder is released to the atmosphere through the supplementary valve mechanism. Immediately upon release of service brake cylinder pressure spring 90 moves the supplementary valve inwardly to the position shown in Figs. 4 and 14, in which all ports in the valve seat 88 are lapped. In addition, cavity 68 in slide valve 17 connects supplementary reservoir port 32 with train pipe port 22, whence supplementary reservoir pressure can flow through passage 23 to passage 21, and thence past check valve 110, unseating the latter against the thrust of its spring 111, and therefore escape to the train pipe in order to create an increased pressure in the train pipe at the car and produce a series of waves in the train pipe from car to car and secure a much quicker release action serially throughout the train than would be the case if all the pressure to release the brakes had to come through the engineer's brake valve. In this position also the cavity 75 in slide valve 16 connects train pipe port 44 with port 46, but as the companion port 48 is blanked no effect is produced. The supplementary valve mechanism remains in lap position during running position of the main valve mechanism in order to blank the connection from the service brake cylinder to the exhaust. The spring 111 is of sufficient strength to prevent valve 110 from opening under initial train pipe pressure to secure service applications, until valve 17 has moved sufficiently to break the connection between train pipe port 22 and supplementary reservoir port 32.

Figure 7:
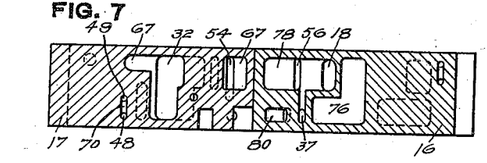

2. Quick service or serial venting position, shown in Fig. 7. This position is assumed upon the first movement of the main piston upon slight reduction of train pipe pressure and results in moving the slide valve 17 from the position shown in Fig. 6 to that shown in Fig. 7 but without moving slide valve 16, due to the lost motion connection between the latter valve and the main piston stem. In this position the connections between the supplementary reservoir port and the train pipe port and between the emergency cylinder and exhaust port are broken by valve 17, and at the same time the cavity 70 in said valve connects ports 48 and 49 and as valve 16 still connects train pipe port 44 with port 46, train pipe pressure flows from port 44 to service brake cylinder port 49. The result is that the train pipe is momentarily vented to the brake cylinder, which is at atmospheric pressure, thereby producing a drop in pressure in the train pipe at the car and securing a quicker serial action of the brakes throughout the train than would be possible if all the air had to flow forwardly and out at the engineer's brake valve. The air passing to the service brake cylinder produces a light setting of the brakes. The feed groove 10 and the supplementary reservoir port 32 are closed, thereby trapping the air in the supplementary reservoir. The spring 90 may be dispensed with, in which event the supplementary valve remains in the position shown in Fig. 13 when running. This would permit the air vented from the train pipe in the quick service position to find its way not only to the service brake cylinder but also to the atmosphere. The valve remains in this position for a brief time, due to the fact that the first movement of the piston 5 moves only the slide valve 17 but as soon as the lost motion between the piston stem 6 and the slide valve 16 is taken up, the added frictional resistance encountered momentarily checks the movement of the piston, thereby providing an appreciable time of venting the train pipe into the brake cylinder. The reduction of train pipe pressure caused thereby produces a sufficient unbalancing of pressures on the opposite sides of the main piston to overcome the friction of both slide valves, and the valve mechanism almost immediately moves over to the next position, now to be described.

Figure 8:
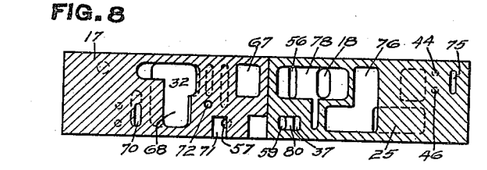
Figure 15:
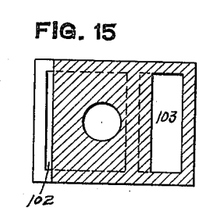

3. Full service position, shown in Fig. 8. In this position, the cavity 80 in valve 16 connects application chamber port 37 with the port 59, while the cavity 71 in valve 17 has uncovered port 57, thereby permitting auxiliary reservoir pressure to flow through port 57, passage 58, port 59, and cavity 80 to port 37 and thence to the application chamber 41, and also to the chamber 83 on the outer face of supplementary piston 84, thereby driving said piston inwardly and bringing valve 87 to the position shown in Fig. 15, slightly uncovering port 102 and permitting supplementary reservoir pressure, which is always acting above slide valve 87, to flow through passages 96 and 57 to the service brake cylinder. Consequently, the brakes are set with a service application from the supplementary reservoir. As soon as the brake cylinder pressure reaches the pressure in piston chamber 83, which is the pressure of application chamber 41, the piston 84 is moved back or outwardly, moving the valve 87 to lap position, shown in Fig. 14 and covering port 102. This outward movement of the supplementary valve does not occur until the brake cylinder pressure equals that in the application chamber, no matter what the piston travel of the brake cylinder. Should the brake cylinder pressure drop from any cause, such as leakage, the piston 84 again moves inwardly, again establishing connection between the auxiliary reservoir and the brake cylinder. The pressure in the brake cylinder is, therefore, always equal to the pressure in the application chamber 41, and entirely irrespective of travel of the brake cylinder piston and of leakage, so that the valve serves to produce and maintain a uniform pressure at all times equal to the pressure in the application chamber. All other ports in the main valve seat are lapped.

Figure 9:
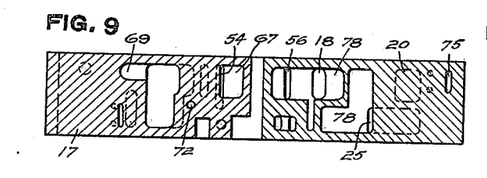

4. Service lap position, shown in Fig. 9. This position is assumed on a slight recoil, such as occurs immediately after a service application, due to a momentary excess of pressure on the train pipe side of the main piston. The slide valve 16 has remained stationary, but the slide valve 17 has moved sufficiently to cover port 57, thereby cutting off further flow of air from the auxiliary reservoir to the application chamber. All other ports in the main valve seat are blanked. The supplementary valve 87, however, will operate as above described to maintain the brake cylinder pressure in case of leakage, moving alternately between the positions shown in Figs. 14 and 15. Should a further increase in braking pressure be desired, the engineer will further reduce train pipe pressure and again move the valves to full service position, thereby permitting more air to flow from the auxiliary reservoir to the application chamber, and the supplementary valve device will at once increase the brake cylinder pressure until it is equal to that in the application chamber. Consequently, the engineer is able to graduate on his brakes up to the point of full equalization of the auxiliary reservoir and application chamber.

Figure 10:
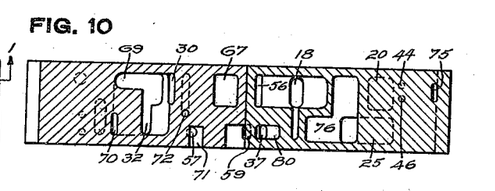

5. High pressure application position, shown in Fig. 10. This position is assumed after a full service application of the brakes, that is, equalization of auxiliary reservoir and application chamber, and in cases where the engineer desires a higher braking pressure. In moving to full service position the end of the main piston stem abuts against the graduating stem 105, and then stops, due to the resistance of graduating spring 106, but when the higher braking pressure is desired the engineer still further reduces train pipe pressure, causing the piston 5 to move still farther outwardly and compress spring 106 until the lost motion in the connection between the graduating stem and the valve 110 is taken up, when the added resistance of spring 111 is encountered and this causes the valve mechanism to stop in the position shown in Fig. 10. In this position, cavity 68 in slide valve 17 connects supplementary reservoir port 32 with emergency brake cylinder port 30, thereby permitting the air from the supplementary reservoir to flow to the emergency brake cylinder and increase the braking power by the added power of the second cylinder. To prevent overcharging the emergency brake cylinder when the valve is in this position, the hole 72 in slide valve 17 registers with port 54, and since companion port 56 is connected to the exhaust port 18 through the cavity 78 in the slide valve 16, this results in exhausting auxiliary reservoir pressure slowly to the atmosphere, and as soon as the pressure on the auxiliary reservoir side of the main piston drops slightly below train pipe pressure, the main valve mechanism moves back to the position next to be described, breaking the connection between the supplementary reservoir port 32 and emergency brake cylinder port 30. This connection from the supplementary reservoir to the emergency brake cylinder may be established as frequently as necessary by successive reductions of train pipe pressure until the supplementary reservoir has equalized with the emergency brake cylinder.

Figure 11:
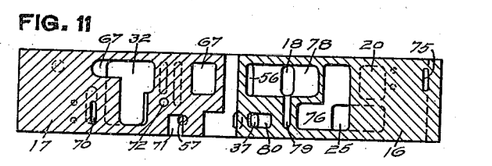

6. High pressure lap position, shown in Fig. 11. This position is assumed by the lapping back of the main valve due to the leaking off of auxiliary reservoir pressure through hole 72 to exhaust port 18 as above described, said valve mechanism being lapped back by the expansion of graduating spring 106. The effect is as above described to break the connection between the supplementary reservoir and the emergency brake cylinder. It will be readily gathered from the last two positions of the valve that after a full service application, that is, after equalization has been established between the auxiliary reservoir and the application chamber, additional pressure can be graduated into the emergency brake cylinder at the will of the engineer, up to the maximum capacity, which is reached upon equalization of the supplementary reservoir with the emergency brake cylinder. It will also be evident that this high pressure application is established without in any way destroying or reducing the sensitiveness of the valve as to release, or in any manner disturbing the braking effect of the other triple valves in the train. The brake rigging can be so adjusted that the ordinary full service application of the brakes provides sufficient power to hold the car when empty, and by establishing the high pressure application above described, power can be had as desired to hold the car when loaded, and even on steep grades, so that the use of hand brakes in coming down steep grades can be entirely dispensed with.

Figure 12:
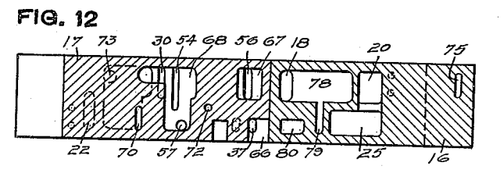

7. Emergency position, shown in Fig. 12. This position is assumed upon a large reduction in train pipe pressure, which causes the main piston 5 to compress both springs 106 and 111 and move fully outwardly, thereby dragging out both slide valves. The cavity 76 of the valve 16 connects train pipe port 20 to emergency brake cylinder port 25, and as the full movement of the piston 5 outwardly has unseated valve 110, train pipe pressure is permitted to flow through passage 21, port 20 and thence to port 25 and passages 25 and 27 to the emergency brake cylinder. This not only supplies the emergency brake cylinder with pressure but also reduces the train pipe pressure at the car and secures the desired quick serial action of the brakes throughout the train. As soon as the pressure in the emergency brake cylinder equals train pipe pressure, the check valve 28 closes. The end cavity 66 in this position registers with the application chamber port 37, allowing auxiliary reservoir pressure to flow to the application chamber and behind the supplementary piston 84, thereby moving the supplementary slide valve 87 and permitting supplementary reservoir pressure to also flow to the service brake cylinder. Consequently, both the service and emergency brake cylinders are supplied with air. If the hole 73 through valve 17 is provided, this in emergency position registers with supplementary reservoir port 32, thereby permitting auxiliary and supplementary reservoir pressures to equalize and results in a full equalization of pressures in the two brake cylinders. In case the hole 73 is not provided, the supplementary valve mechanism will, nevertheless, serve to maintain the brake cylinder pressure against leakage.

The emergency position of the valve can be secured either directly from full release position or from any of the other positions of the valve by merely reducing the train pipe pressure below the point of equalization of the auxiliary reservoir pressure with brake cylinder pressure.

The valve described performs all of the usual functions of freight triple valves, and in addition provides for a quick service application of the brakes, a quick release of the brakes, and for the high pressure application after full service application as above described. It is furthermore so arranged as to secure uniform pressure in the service brake cylinder irrespective of piston travel and to maintain such pressure against leakage. By this valve, sufficient power can be secured in the high pressure application position to hold loaded cars when going down steep grades so as to dispense with the use of hand brakes as is necessary with present types of freight triple valves. When this improved triple valve is used in connection with my train pipe pressure maintenance valve described and claimed in my application filed June 24, 1912, Serial No. 705,566, it produces practically ideal conditions in freight service as there cannot be any variation in service application pressure without the knowledge of the engineer, or indeed without having been purposely brought about by him.

What I claim is:—

1. Triple valve mechanism comprising a casing having connections for a train pipe, a service brake cylinder, an extra brake cylinder, a reservoir on a car, and a source of pressure, a movable abutment in said casing actuated by variations in train pipe pressure, and valve means directly actuated by said movable abutment and arranged upon reduction in train pipe pressure after equalization of the service brake cylinder with the reservoir on a car to establish connection between the source of pressure and the extra brake cylinder.

2. Triple valve mechanism comprising a casing having connections for a train pipe, a pair of brake cylinders, a reservoir on a car, and a source of pressure, a movable abutment in said casing operating under variations in train pipe pressure, and valve mechanism actuated by said movable abutment and arranged upon service reduction of train pipe pressure to cause the source of pressure to be connected with one of the brake cylinders and upon reduction of train pipe pressure after full service application to connect the source of pressure to the other brake cylinder.

3. Triple valve mechanism comprising a casing having connections for a train pipe, a pair of brake cylinders, a reservoir on a car, and a source of pressure, a movable abutment in said casing operative by variations in train pipe pressure, and valve means actuated by said movable abutment and arranged upon service reduction of train pipe pressure to connect the reservoir with a supplementary valve means and upon reduction of train pipe pressure after full service application to connect the source of pressure to one of the brake cylinders and supplementary valve means arranged upon the admission of pressure thereto to connect the source of pressure to the other brake cylinder and to maintain brake cylinder pressure against leakage.

4. Triple valve mechanism comprising a casing having connections for a train pipe, a pair of brake cylinders, and a source of pressure, a movable abutment in said casing operating by variations in train pipe pressure, and valve means actuated by said movable abutment and arranged upon service reduction in train pipe pressure to cause admission of pressure to one of the brake cylinders and upon further reduction in train pipe pressure after full service application to admit pressure to the other brake cylinder.

5. Triple valve mechanism comprising a casing having connections for a train pipe, a pair of brake cylinders, and a source of pressure, a movable abutment in said casing operating by variations in train pipe pressure, and valve means actuated by said movable abutment and arranged upon service reduction of train pipe pressure to cause admission of pressure to one of the brake cylinders and upon further reduction of train pipe pressure after full service application to admit pressure to the other brake cylinder, and a supplementary valve device actuated by the primary valve device and arranged to maintain brake cylinder pressure against leakage.

6. In a fluid pressure brake, the combination of a train pipe, a pair of brake cylinders, an auxiliary reservoir, a supplementary reservoir, and means operative by variations in train pipe pressure and arranged upon service reduction in train pipe pressure to establish communication between the supplementary reservoir and one of said brake cylinders and upon further reduction of train pipe pressure after full service application to establish communication between the supplementary reservoir and the other brake cylinder.

7. In a fluid pressure brake, the combination of a train pipe, a pair of brake cylinders, an auxiliary reservoir, a supplementary reservoir, means operative by variations in train pipe pressure and arranged upon service reduction in train pipe pressure to establish communication between the auxiliary reservoir and a supplementary valve device and upon further reduction of train pipe pressure after full service application to establish communication between the supplementary reservoir and one of the brake cylinders, and a supplementary valve device actuated from said means and arranged to connect the supplementary reservoir to the other brake cylinder and maintain brake cylinder pressure against leakage.

8. In a fluid pressure brake, the combination of a train pipe, braking mechanism, a reservoir on a car, a main valve mechanism operative by variations in train pipe pressure, a supplementary valve mechanism operative from said main valve mechanism, and ports and passages so arranged that upon service reduction of train pipe pressure the supplementary valve mechanism opens communication from the reservoir to the braking mechanism, and upon reduction of train pipe pressure after full service application said main valve mechanism establishes communication between the reservoir and the braking mechanism.

9. In a fluid pressure brake, the combination of a train pipe, a pair of brake cylinders, a reservoir, a main valve mechanism operative by variations in train pipe pressure, a supplementary valve mechanism operated by pressure admitted thereto by the main valve mechanism, and ports and passages so arranged that upon service reduction of train pipe pressure the supplementary valve mechanism opens communication from the reservoir to one of said brake cylinders and upon reduction of train pipe pressure after full service application the main valve mechanism establishes communication between the reservoir and the other brake cylinder.

10. In a fluid pressure brake, the combination of a train pipe, a pair of brake cylinders, a reservoir, a main valve mechanism operative by variations in train pipe pressure, a supplementary valve mechanism operated by pressure admitted thereto by the main valve mechanism, and ports and passages so arranged that upon service reduction of train pipe pressure the supplementary valve mechanism opens communication from the reservoir to one of said brake cylinders, and upon the reduction of train pipe pressure after full service application the main valve mechanism establishes communication between the reservoir and the other brake cylinder, said supplementary valve mechanism being arranged to maintain said brake cylinder pressure against leakage.

11. In a fluid pressure brake, the combination of a train pipe, brake cylinder, a reservoir capacity on a car, a pressure chamber, means arranged upon reduction of train pipe pressure to establish communication between said reservoir capacity and said pressure chamber and upon increase of train pipe pressure to establish communication between said reservoir capacity and the train pipe, a check valve in said last named connection opening toward the train pipe, and means actuated by pressure in said pressure chamber for establishing communication between said reservoir capacity and the brake cylinder.

12. In a fluid pressure brake, the combination of a train pipe, brake cylinder, auxiliary reservoir, supplementary reservoir, a pressure chamber, means actuated upon reduction of train pipe pressure to establish communication between the auxiliary reservoid and said pressure chamber and upon increase in train pipe pressure to establish communication between said supplementary reservoir and the train pipe, and means actuated by pressure in said pressure chamber and arranged to establish communication between the supplementary reservoir and the brake cylinder.

13. In a fluid pressure brake, the combination of a train pipe, braking mechanism, a source of pressure, a pressure chamber, means actuated by reduction in train pipe pressure and arranged to establish communication between the source of pressure and said pressure chamber, a valve mechanism actuated by pressure in said pressure chamber and arranged to establish communication between the source of pressure and the braking mechanism, said means being arranged upon further reduction in train pipe pressure after full service application to establish communication between the source of pressure and the braking mechanism.

14. In a fluid pressure brake, the combination of a train pipe, braking mechanism, a source of pressure, a pressure chamber, means actuated by reduction in train pipe pressure and arranged to establish communication between the source of pressure and said pressure chamber, a valve mechanism actuated by pressure in said chamber and arranged to establish communication between the source of pressure and the braking mechanism, said means being arranged upon further reduction in train pipe pressure after full service application to establish communication between the source of pressure and the braking mechanism, and said valve mechanism being arranged to maintain the brake pressure against leakage.

15. In a fluid pressure brake, the combination of a train pipe, braking mechanism, a reservoir capacity on a car, a pressure chamber, a primary valve mechanism actuated by variations in train pipe pressure and arranged upon service reductions in train pipe pressure to establish communication between said reservoir capacity and said pressure chamber and upon reduction in train pipe pressure after full service application to establish communication between a source of pressure and the braking mechanism, and a supplementary valve mechanism actuated by pressure in said pressure chamber and arranged to establish communication between said reservoir capacity and the braking mechanism.

16. In a fluid pressure brake, the combination of a train pipe, braking mechanism, reservoir capacity on a car, a pressure chamber, a primary valve mechanism actuated by variations in train pipe pressure and arranged upon service reductions in train pipe pressure to establish communication between said reservoir capacity and said pressure chamber and upon reduction in train pipe pressure after full service application to establish communication between a source of pressure and the braking mechanism, and a supplementary valve mechanism actuated by pressure in said pressure chamber and arranged to establish communication between said reservoir capacity and the braking mechanism and also arranged to maintain the braking mechanism pressure against leakage.

17. In a fluid pressure brake, the combination of a train pipe, braking mechanism, an auxiliary reservoir, a supplementary reservoir, a pressure chamber, a primary valve mechanism actuated by variations in train pipe pressure and arranged upon service reduction in train pipe pressure to establish communication between the auxiliary reservoir and said pressure chamber and upon reduction in train pipe pressure after full service application to establish communication between the supplementary reservoir and the braking mechanism, and a supplementary valve mechanism actuated by pressure in said pressure chamber and arranged to establish communication between the supplementary reservoir and the braking mechanism.

18. In a fluid pressure brake, the combination of a train pipe, braking mechanism, an auxiliary reservoir, a supplementary reservoir, a pressure chamber, a primary valve mechanism actuated by variations in train pipe pressure and arranged upon service reduction in train pipe pressure to establish communication between the auxiliary reservoir and said pressure chamber and upon reduction in train pipe pressure after full service application to establish communication between the supplementary reservoir and the braking mechanism, and a supplementary valve mechanism actuated by pressure in said pressure chamber and arranged to establish communication between the supplementary reservoir and the braking mechanism and also arranged to maintain the braking mechanism pressure against leakage.

19. In a fluid pressure brake, the combination of a train pipe, a pair of brake cylinders, reservoir capacity on a car, a pressure chamber, a primary valve mechanism operated by variations in train pipe pressure and arranged upon service reductions in train pipe pressure to establish communication between said reservoir capacity and said pressure chamber and upon reduction in train pipe pressure after full service application to establish communication between said reservoir capacity and one of the brake cylinders, and a supplementary valve mechanism actuated by pressure in said pressure chamber and arranged to establish communication between said reservoir capacity and the other of said brake cylinders.

20. In a fluid pressure brake, the combination of a train pipe, a pair of brake cylinders, reservoir capacity on a car, a pressure chamber, a primary valve mechanism operated by variations in train pipe pressure and arranged upon service reductions in train pipe pressure to establish communication between said reservoir capacity and said pressure chamber and upon reduction in train pipe pressure after full service application to establish communication between said reservoir capacity and one of the brake cylinders, and a supplementary valve mechanism actuated by pressure in said pressure chamber and arranged to establish communication between said reservoir capacity and the other of said brake cylinders and also arranged to maintain the brake cylinder pressure against leakage.

21. In a fluid pressure brake, the combination of a train pipe, a brake cylinder, a reservoir on a car, valve mechanism actuated by variations in train pipe pressure and arranged upon service reductions in train pipe pressure to actuate a supplementary valve device, and a supplementary valve device actuated from the main valve device and arranged to establish communication between the reservoir and the brake cylinder, said main valve mechanism being arranged upon increase of train pipe pressure to establish communication between said reservoir and the train pipe.

22. In a fluid pressure brake, the combination of a train pipe, braking mechanism, a reservoir on a car, valve mechanism actuated by variations in train pipe pressure and arranged upon service reductions in train pipe pressure to actuate a supplementary valve device, a supplementary valve device actuated from the main valve mechanism and arranged to establish communication between the reservoir and the braking mechanism, said main valve mechanism being arranged upon increase of train pipe pressure to establish communication between said reservoir and the train pipe and upon decrease in train pipe pressure below full service application to establish communication between said reservoir and the braking mechanism.

23. In a fluid pressure brake, the combination of a train pipe, braking mechanism, reservoir capacity on a car, a pressure chamber, valve mechanism operative by variations in train pipe pressure and arranged upon service reduction of train pipe pressure to establish communication between said reservoir capacity and said pressure chamber, upon decrease of train pipe pressure below full service application to establish communication between said reservoir capacity and the braking mechanism, and upon increase of train pipe pressure to establish communication between the reservoir capacity and the train pipe, and supplementary valve mechanism actuated by pressure in said pressure chamber for establishing communication between said reservoir capacity and the braking mechanism.

24. In a fluid pressure brake, the combination of a train pipe, braking mechanism, reservoir capacity on a car, a pressure chamber, valve mechanism operative by variations in train pipe pressure and arranged upon service reduction of train pipe pressure to establish communication between said reservoir capacity and said pressure chamber, upon decrease of train pipe pressure below full service application to establish communication between said reservoir capacity and the braking mechanism and upon increase of train pipe pressure to establish communication between the reservoir capacity and the train pipe, and supplementary valve mechanism actuated by pressure in said pressure chamber for establishing communication between said reservoir capacity and the braking mechanism and maintaining said brake cylinder pressure against leakage.

25. In a fluid pressure brake, the combination of a train pipe, a pair of brake cylinders, a reservoir capacity on a car, a pressure chamber, valve mechanism operative by variations in train pipe pressure and arranged on service application reductions of train pipe pressure to establish communication between said reservoir capacity and said pressure chamber, upon reduction of train pipe pressure below full service application to establish communication between said reservoir capacity and one of the brake cylinders and upon increase of train pipe pressure to establish communication between said reservoir capacity and the train pipe, and supplementary valve mechanism actuated by pressure in said pressure chamber for establishing communication between said reservoir capacity and the other brake cylinder.

26. In a fluid pressure brake, the combination of a train pipe, a pair of brake cylinders, a reservoir capacity on a car, a pressure chamber, valve mechanism operative by variations in train pipe pressure and arranged on service application reductions of train pipe pressure to establish communication between said reservoir capacity and said pressure chamber, upon reduction of train pipe pressure below full service application to establish communication between said reservoir capacity and one of the brake cylinders and upon increase of train pipe pressure to establish communication between said reservoir capacity and the train pipe, and supplementary valve mechanism actuated by pressure in said pressure chamber for establishing communication between said reservoir capacity and the other brake cylinder and so arranged as to maintain said brake cylinder pressure against leakage.

27. In a fluid pressure brake, the combination of a train pipe, braking mechanism, a reservoir capacity on a car, a pressure chamber, valve mechanism operative upon variations in train pipe pressure and arranged on service reduction in train pipe pressure to connect said reservoir capacity to said pressure chamber, upon decrease in train pipe pressure below full service application to connect said reservoir capacity to the braking mechanism and upon increase in train pipe pressure to connect said reservoir capacity to the train pipe, and a supplementary valve mechanism actuated by pressure in said pressure chamber and arranged upon admission of pressure thereto to connect said reservoir capacity to the braking mechanism and upon exhaustion of pressure therefrom to connect the braking mechanism to the atmosphere.

28. In a fluid pressure brake, the combination of a train pipe, a brake cylinder, a reservoir capacity on a car, a pressure chamber, valve mechanism operative by variations in train pipe pressure and arranged upon service reduction in train pipe pressure to connect said reservoir capacity to the pressure chamber, and upon increase of train pipe pressure to connect said pressure chamber to the atmosphere and upon decrease in train pipe pressure below full service application to connect said reservoir capacity to the brake cylinder, and a supplementary valve mechanism actuated by pressure in said pressure chamber and arranged upon admission of pressure thereto to connect the reservoir capacity to a brake cylinder and upon the exhaustion of pressure therefrom to connect the brake cylinder to the atmosphere.

29. In a fluid pressure brake, the combination of a train pipe, brake cylinders, a reservoir capacity on a car, a pressure chamber, valve mechanism operative by variations in train pipe pressure and arranged upon brake releasing increase in train pipe pressure to connect said pressure chamber to the atmosphere and connect the reservoir capacity to the train pipe, and a supplementary valve device actuated by pressure in said pressure chamber and arranged upon admission of pressure thereto to connect said reservoir capacity to a brake cylinder and upon the release of pressure therefrom to connect the brake cylinder to the atmosphere.

30. In a fluid pressure brake, the combination of a train pipe, brake cylinders, a reservoir capacity on a car, a pressure chamber, valve mechanism operative by variations in train pipe pressure and arranged upon service reduction in train pipe pressure to connect said reservoir capacity to said pressure chamber, upon reduction in train pipe pressure below full service application to connect said reservoir capacity to a brake cylinder and upon increase in train pipe pressure to connect said pressure chamber to the atmosphere and connect said reservoir capacity to the train pipe, and a supplementary valve device actuated by pressure in said pressure chamber and arranged upon admission of pressure thereto to connect said reservoir to a brake cylinder and upon the release of pressure therefrom to connect the brake cylinder to the atmosphere.

31. A triple valve having connections to the atmosphere, train pipe, brake cylinder, and a reservoir capacity on a car, ports and valve mechanism arranged on service reduction of train pipe pressure to establish communication from the reservoir capacity to a supplementary valve device, upon reduction of train pipe pressure below service reduction to connect the reservoir capacity with a brake cylinder, and upon increase in train pipe pressure to connect said supplementary valve device to the atmosphere, and a supplementary valve device operative by the pressure in the brake cylinder and the pressure admitted thereto by the main valve device and arranged when the main valve device is in service position to admit fluid pressure to a brake cylinder, when the main valve device is in service lap position to maintain the brake cylinder pressure against leakage and when the valve is in release position to connect the brake cylinder to the atmosphere.

32. A triple valve having connections to the atmosphere, train pipe, brake cylinders, reservoir capacity on a car, ports and valve mechanism arranged on service reduction of train pipe pressure to admit air from the reservoir capacity to a supplementary valve device, and upon decrease in train pipe pressure below service application to admit air from the reservoir capacity to a brake cylinder and upon increase in train pipe pressure to connect said supplementary valve device to the atmosphere, and a supplementary valve device arranged when the main valve device is in service position to admit fluid pressure to a brake cylinder and when the main valve is in release position to connect the brake cylinder to the atmosphere.

33. A triple valve having connections to the atmosphere, train pipe, brake cylinders, a reservoir capacity on a car, ports and valve mechanism arranged on service reduction of train pipe pressure to establish communication between the reservoir capacity and a supplementary valve device, upon further reduction in train pipe pressure to establish communication between the reservoir capacity and a brake cylinder, and upon increase in train pipe pressure to connect said supplementary valve device to the atmosphere and connect the reservoir capacity to the train pipe, and a supplementary valve device operating between brake cylinder pressure and pressure admitted thereto by the main valve device and arranged when the valve is in service position to admit air from a source of fluid pressure to the brake cylinder, when the valve is in service lap position to maintain the brake cylinder pressure against leakage and when the main valve is in release position to connect the brake cylinder to the atmosphere.

34. In a triple valve, the combination of a piston operating by variations in train pipe pressure, a spring-held graduating stem arranged to be contacted by said piston, a valve carried by said graduating stem and controlling communication between the train pipe and the brake cylinder, said valve having a limited movement on said stem whereby it may open without movement of said stem, and a spring normally holding said valve to its seat.

35. In a triple valve, the combination of a piston operating under reduction of train pipe pressure, a spring-held graduating stem arranged to be contacted by said piston, a valve slidable on said stem and controlling communication between the train pipe and brake cylinder, and a spring normally holding said valve to its seat, said valve and stem being joined by a slot and pin connection so arranged that the valve may move to open position without movement of the stem.

36. In a triple valve, the combination of a piston operating by variations in train pipe pressure, a spring-held graduating stem arranged to be contacted by said piston, a valve slidable on said graduating stem and controlling communication between the train pipe and the brake cylinder, said valve having a limited movement on said stem whereby it may open without movement of said stem and said stem having a limited outward movement without opening said valve, and a spring normally holding said valve to its seat.

37. In a triple valve, the combination of a piston operating by variations in train pipe pressure, a spring-held graduating stem arranged to be contacted by said piston, a valve slidable on said stem and controlling communication between the train pipe and brake cylinder, and a spring normally holding said valve to its seat, said valve and stem being joined by a slot and pin connection with the slot of such length that the valve may move to open position without movement of the stem and the stem may have a limited outward movement without unseating the valve.

In testimony whereof, I have hereunto set my hand.

JACOB RUSH SNYDER.

Witnesses:
WILLIAM B. WHARTON,
WM. P. LARKIN.

Copies of this patent may be obtained for five cents each, by addressing the "Commissioner of Patents, Washington, D. C."